United States Patent [19]
Henriksen

[11] Patent Number: 5,964,560
[45] Date of Patent: Oct. 12, 1999

[54] SCREW FASTENER

[76] Inventor: Arne Henriksen, 28 Rosewood Dr., Hawthorne Woods, Ill. 60047

[21] Appl. No.: 08/887,094

[22] Filed: Jul. 2, 1997

Related U.S. Application Data

[63] Continuation of application No. 08/515,512, Aug. 15, 1995, abandoned.

[51] Int. Cl.⁶ ..................................................... F16B 25/00
[52] U.S. Cl. ............................ 411/386; 411/404; 411/416
[58] Field of Search ..................... 411/386, 387, 411/403, 404, 416, 424, 387.2, 387.4

[56] References Cited

U.S. PATENT DOCUMENTS

| | | | |
|---|---|---|---|
| 4,069,730 | 1/1978 | Gutshall | 411/386 |
| 4,269,246 | 5/1981 | Larson et al. | 411/403 |
| 4,315,340 | 2/1982 | Veldman | 411/416 |
| 5,242,253 | 9/1993 | Fulmer | 411/386 |
| 5,244,327 | 9/1993 | Whitesell . | |
| 5,435,680 | 7/1995 | Schuster | 411/404 |
| 5,461,952 | 10/1995 | Goss | 411/404 |
| 5,641,258 | 6/1997 | Solo | 411/403 X |

FOREIGN PATENT DOCUMENTS

| | | | |
|---|---|---|---|
| 2807957 | 9/1978 | Germany | 411/403 |
| 0957675 | 5/1964 | United Kingdom | 411/416 |
| 2055652 | 3/1981 | United Kingdom | 411/387 |

OTHER PUBLICATIONS

Continental/Midland, "Step Taper CA Point Screws", 1984 (411/404).
Continental/Midland, "Torx Systems", 1984 (411/404).

*Primary Examiner*—Brian K. Green
*Assistant Examiner*—Robert G. Santos
*Attorney, Agent, or Firm*—Hill & Simpson

[57] ABSTRACT

A threaded fastener for securing a first material to a support member is provided comprising a tapping or tap screw point at a first end, a threaded shank with three separate leads, a first portion of the shank, adjacent to the tap screw point, being of a trilobular thread design, a second portion of the shank, distal from the tap screw point, being unthreaded, and a head at an end opposite the tap screw point having an enlarged diameter and a countersunk shape to reduce the likelihood of pull through of the fastener through said first material, yet to allow the head to be introduced flush with a surface of the first material.

17 Claims, 1 Drawing Sheet

U.S. Patent    Oct. 12, 1999    5,964,560
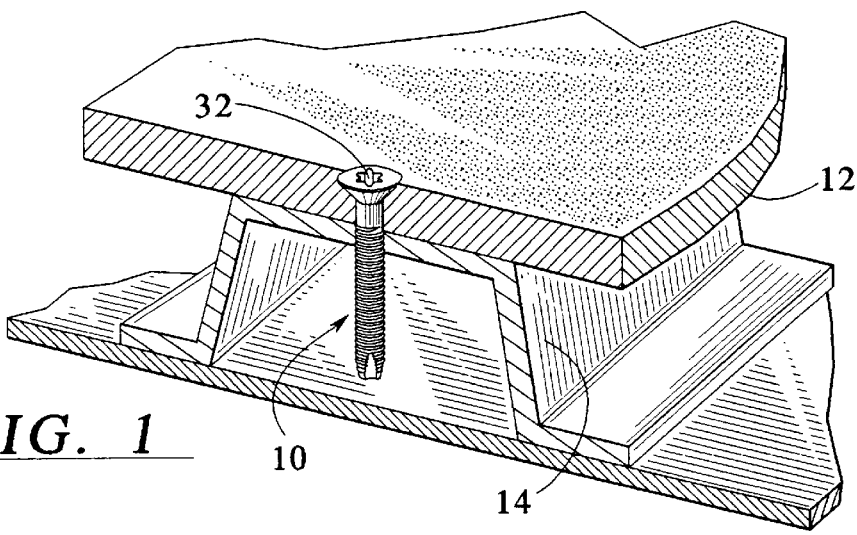
*FIG. 1*
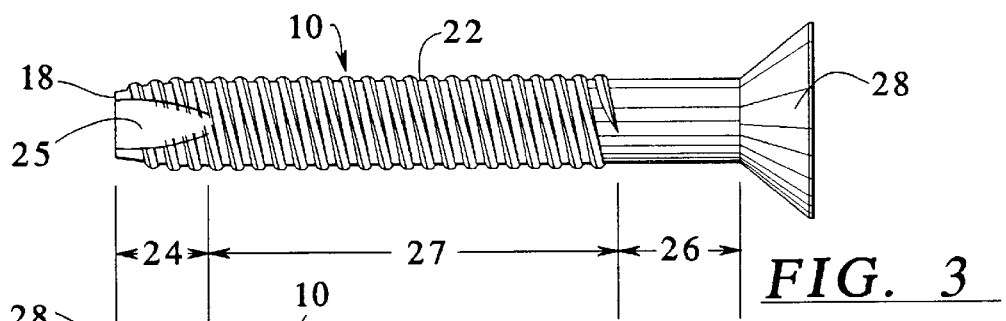
*FIG. 3*
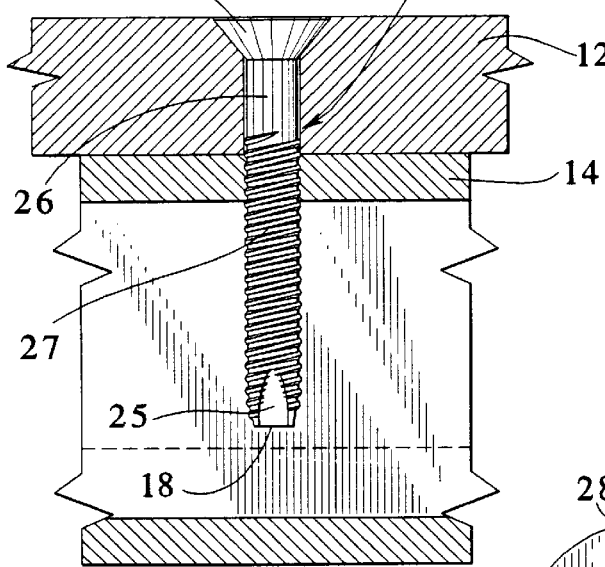
*FIG. 2*
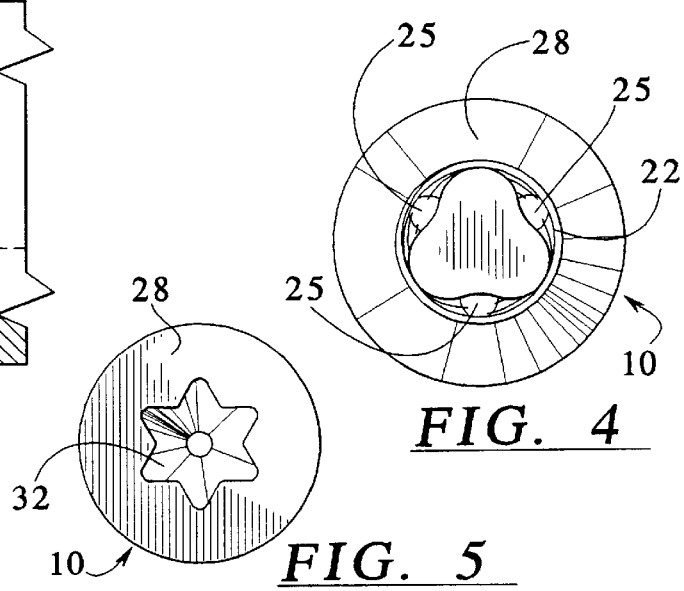
*FIG. 5*
*FIG. 4*

SCREW FASTENER

This is a continuation, of application Ser. No. 08/515,512, filed Aug. 15, 1995 now abandoned.

BACKGROUND OF THE INVENTION

The present invention relates to a fastener, and in particular to a screw type threaded fastener used in securing two items together, such as a floor board to a truck body, or other similar application.

In certain environments, for example in the application of a wood or plastic material wall to metal channels, frames or plates in the interior of a semi-trailer truck body, threaded fasteners are used which need to address many different problems.

The threaded fastener should have some means for remaining secured to the metal frame so that the fastener will not come loose in the high vibration environment in which it is used.

Also, it is desirable for the fastener to thread quickly into the materials to be fastened together.

Some commercially available threaded fasteners address some of these problems, however Applicant is not aware of any fasteners which adequately address each of these problems. Therefore, it would be an improvement in the art if fasteners were provided which satisfactorily address each of the above considerations.

SUMMARY OF THE INVENTION

The present invention provides an improved fastener which has particular utility in securing two items together, such as a wood, plastic material, aluminum or metal wall or other first material to a ferrous metal or aluminum support such as a ferrous metal or non-ferrous channel or frame. The improved fastener has a tapping point tip to make the screw self-tapping in order to form its own thread in both of the materials it is securing together by displacement of surrounding material rather than cutting of the surrounding material.

A shank of the screw has a first trilobular thread area which rolls threads rather than cutting threads for a tighter fit. The thread has flats provided at the tip and three threads formed on the shank have beginnings at the tapping point, with one lead starting at each lobe. Preferably the screw has 18 threads per inch when the shank has a diameter of 5/16 inches and 20 threads per inch when the shank has a diameter of 1/4", thus resulting in a thread angle (when viewed from the side of the fastener) of about 11 degrees to provide a thread which will cause the fastener to be drawn into the material quickly, however, not so fast as to prevent the fastener from being able to cut into metal and to pull itself into the metal. The threads continue along the shank from the tip, but stop short of the head at an unthreaded portion of the shank.

Above the threaded portion of the shank and the unthreaded portion is the screw head which has an enlarged diameter to prevent the head from pulling through the first material. Preferably the head is a countersunk style head which will allow the head to be drawn down into the first material until it is flush with the surface of the first material. Also, the head has a drive recess which preferably is a 6 lobe recess to give the fastener ease of driving without cam out and prevent unauthorized tampering with the fastener once it has been threaded into place. Once the fastener is driven into place, the angle of the thread offers higher break loose torque to prevent the part from coming out under vibration.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

FIG. 1 is a perspective view of a semi-trailer floor showing a fastener embodying the principles of the present invention in place.

FIG. 2 is a cross-sectional view of the fastener in place.

FIG. 3 is a side elevational view of the fastener alone.

FIG. 4 is an end view of the fastener taken from the point end.

FIG. 5 is an end view of the fastener taken from the head end.

DETAILED DESCRIPTION OF THE PREFERRED EMBODIMENTS

FIG. 1 illustrates an improved fastener embodying the principles of the present invention generally at 10. Although a fastener such as that disclosed and described can be used in many environments, for purposes of disclosure of the invention, one particular environment in which the fastener finds particular utility is shown. Such an environment is to secure a first or surface material, such as a floor board 12 generally formed of aluminum, hard wood or plastic, to a metal support 14, generally a channel member, frame or metal plate in the interior of a semi-trailer truck or truck body.

The fastener itself is shown in greater detail in FIGS. 2–5. In particular, the fastener is provided at a first end with a tapping point 18 designed to provide actual tapping action to permit the fastener 10 to tap through both the floor board 12 as well as the metal support 14. Following the tapping point 18 on a shank 22 of the fastener is a portion 24 which has a trilobular thread form design which rolls threads by dispersing the surrounding material rather than cutting threads, to result in a tighter fit between the fastener and the surrounding materials.

The trilobular portion 24 has three flat areas 25 (FIG. 4) such that three (separate lead in areas for three separate threads) begin at the tapping point to ensure quick starting of the thread formation in the surrounding material. Another portion 26 of the shank 22, more distal from the tapping point 18 is free of threads and is to be positioned in the floor board 12 (FIG. 2) for the reasons described below. A central portion 27 has a standard circular cross section.

Most distal from the tapping point end is a head 28 of the fastener. A diameter of the head 28 is enlarged beyond the diameter of the shank 22 to prevent a pull through of the fastener 10 relative to the floor board 12. Preferably the head 28 is a countersunk or recess style flat head which will allow the head to be drawn down into the first material 12 until it is flush with the surface of the first material. Also, the head has a drive recess 32 which preferably is a 6 lobe recess to prevent unauthorized tampering with the fastener once it has been threaded into place, to reduce tool wear and also to prevent cam out while the fastener is being driven.

A length of the threaded portion 27 is selected to assure positioning of the threaded portion 27 within the metal support wall area 14 upon complete insertion of the screw 10. A length of the unthreaded portion 26 is selected to be long enough to accommodate the thickness of the floor board 12 and to position the threaded portion 27 in the metal support wall.

Although a most preferred embodiment would have the length of the unthreaded portion 26 plus the height of the head 28 exactly equal to a thickness of the surface material 12, so that the fastener 10 can be threaded down tight to the underlying support such as the metal support 14, without any binding interference due to engagement of threads in the surface material, it is not always possible to be assured of such precise measurements. It is necessary, however, that the threads start immediately below the surface material 12 in that the support material 14 may, in many instances, be no more than 1/8" thick. Thus, if the unthreaded portion 26 extended below the surface material 12, there would not be any threads present to engage with the support member 14.

Since surface materials used with truck bodies range from about 3/4" to 1 3/8", and to avoid a large inventory of different sized screws with different unthreaded lengths 26, it has been determined that an unthreaded length of 1/2" to 5/8" (when including the head axial length) is sufficient to provide the necessary function for the unthreaded portion. Because it is helpful to prevent a binding of threads in the surface material 12, by having this amount of unthreaded portion 26, the remaining threaded portion which remains in the surface material is insufficient to cause a binding. In fact, this area breaks away since the surface material is generally wood or plastic material and the unthreaded region 26 provides an unhindered area for relief of portions of the surrounding material to break away to, upon continued rotation of the threaded fastener after the head 28 has "bottomed out" into the surface material.

FIG. 5 illustrates the head end of the screw where it is seen that there is a special drive socket 32, such as a 6 lobe design, which helps to eliminate or reduce tool wear and also to prevent cam out while driving the fastener.

Thus it is seen that the present invention provides an improved threaded fastener which addresses a number of problems in particular fastening environments and provides for self tapping for the fastener, a threaded portion which enhances gripping, an unthreaded portion for engaging a material to be held in place, and an enlarged head for preventing pull through of the fastener through the held material.

Applicant has found that this particular fastener, with the 11° thread angle, the three separate leads and trilobular tip surprisingly and unexpectedly runs or installs 50% faster than previously used fasteners. Also surprisingly, this fastener has a higher back out torque than previously used fasteners, thus improving the tendency for this fastener to avoid loosening in high vibration environments.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A threaded fastener for securing a first material to a second material comprising:
    a first end having means formed thereon for forming a threaded passage for said fastener through said first material and said second material;
    a threaded shank;
    a first portion of said shank, adjacent to said first end, having a length and having a first, second and third separate leads and a first, second and third separate threads formed thereon, said first lead being connected to said first thread, said second lead being connected to said second thread, said third lead being connected to said third thread, the first, second and third threads being separate from one another whereby the first thread is not connected to the second and third threads and the second thread is not connected to the third thread, the first, second and third separate threads extending helically and continuously along the length of the first portion of the shank,
    a head at an end opposite said first end having an enlarged diameter for reducing the likelihood of pull through of said fastener through said first material and said second material,
    a second portion of said shank, distal from said first end, said second portion being unthreaded, the first and second portions of the shank being of a uniform diameter, and a drive recess formed in said head;
    the first, second and third threads extending separately from one another along the length of the first portion up to the unthreaded second portion.

2. A threaded fastener according to claim 1, wherein said first end has a tapping point formed thereon.

3. A threaded fastener according to claim 1, wherein said first end has a trilobular thread design.

4. A threaded fastener according to claim 1, wherein said head comprises a recess style head.

5. A threaded fastener according to claim 1, wherein said drive recess in said head comprises a tool socket having a configuration to reduce tool wear.

6. A threaded fastener according to claim 1, wherein said drive recess is a 6 lobe recess.

7. An assembly comprising:
    a threaded fastener securing a first material of a predetermined thickness to a support member also having a predetermined thickness,
    the threaded fastener comprising:
        a first end having means formed thereon for forming a threaded passage for said fastener through said first material and said support member;
        a threaded shank;
        a first portion of said shank, adjacent to said first end, having a first, second and third separate leads and a first, second and third separate threads formed thereon, said first lead being connected to said first thread, said second lead being connected to said second thread, said third lead being connected to said third thread, the first, second and third threads being separate from one another whereby the first thread is not connected to the second and third threads and the second thread is not connected to third thread, the first, second and third separate threads extending helically and continuously along the length of this first portion of the shank, said first portion being of a length at least as great as said predetermined thickness of said support member,
        a second portion of said shank, distal from said first end, being of a length approximately the same as said predetermined thickness of said first material, said second portion of said shank being unthreaded, the first and second portions of the shank being of a uniform diameter;
        the first, second and third threads extending separately from one another along the length of the first portion up to the unthreaded second portion;

a head at an end opposite said first end having an enlarged diameter for reducing the likelihood of pull through of said fastener through said first material; and a drive recess formed in said head.

8. A threaded fastener according to claim 7, wherein said first end has a tap point formed thereon.

9. A threaded fastener according to claim 7, wherein said first portion of said shank has a trilobular thread design.

10. A threaded fastener according to claim 7, wherein said head comprises a recess style head.

11. A threaded fastener according to claim 7, wherein said head is provided with a tool socket having a configuration to reduce tool wear.

12. A threaded fastener according to claim 7, wherein said drive recess is a 6 lobe recess.

13. A triple threaded fastener for securing a liner material to a support member, comprising:

a tap point at a first end;

a threaded shank;

a first portion of said shank, adjacent to said tap point, having a length and having three separate leads connected to three separate side-by-side threads, the three separate threads not being connected to one another and extending helically and continuously along the length of the first shank, a second portion of said shank, distal from said tap point, being unthreaded;

the first, second and third threads extending separately from one another along the length of the first portion up to the unthreaded second portion;

the first and second portions of the shank being of a uniform diameter;

a head at an end opposite the tap point having an enlarged diameter for reducing the likelihood of pull through of said fastener through said liner material; and a drive recess formed in said head.

14. A threaded fastener according to claim 13, wherein said drive recess in said head is a tool socket having a configuration to reduce tool wear.

15. A threaded fastener according to claim 13, wherein said liner material has a predetermined thickness and said support member also has a predetermined thickness, and said first portion of said shank having a length which is adapted to be at least as great as said predetermined thickness of said support member and said second portion of said shank having a length which is adapted to be approximately the same as said predetermined thickness of said liner material.

16. A threaded fastener according to claim 13, wherein said head comprises a recess style head.

17. A threaded fastener according to claim 13, wherein said drive recess is a 6 lobe recess.

* * * * *